(12) United States Patent
Tsuchida

(10) Patent No.: US 6,870,692 B2
(45) Date of Patent: Mar. 22, 2005

(54) WIDE ANGLE LENS SYSTEM

(75) Inventor: Hirofumi Tsuchida, Kunitachi (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/360,658

(22) Filed: Feb. 10, 2003

(65) Prior Publication Data

US 2003/0161053 A1 Aug. 28, 2003

(30) Foreign Application Priority Data

Feb. 28, 2002 (JP) .................................... 2002-053440

(51) Int. Cl.$^7$ ............................................. G02B 9/12
(52) U.S. Cl. ............................... 359/784; 359/797
(58) Field of Search ................................ 359/784, 797, 359/753

(56) References Cited

U.S. PATENT DOCUMENTS

| | | | | | |
|---|---|---|---|---|---|
| 4,929,068 A | * | 5/1990 | Tsuji | ........................... | 359/708 |
| 4,976,526 A | * | 12/1990 | Oshima et al. | .............. | 359/737 |
| 5,943,172 A | * | 8/1999 | Sasaya et al. | ................ | 359/754 |
| 6,130,787 A | | 10/2000 | Tsuchida | ..................... | 359/654 |
| 6,226,132 B1 | * | 5/2001 | Abe | ............................ | 359/797 |
| 6,621,641 B2 | * | 9/2003 | Takatsuki | .................... | 359/680 |
| 2001/0008418 A1 | * | 7/2001 | Yamanaka et al. | ........... | 348/222 |
| 2003/0125080 A1 | * | 7/2003 | Shimamura | ................. | 455/556 |

FOREIGN PATENT DOCUMENTS

JP          10-115776          6/1998

* cited by examiner

*Primary Examiner*—Georgia Epps
*Assistant Examiner*—M. Hasan
(74) *Attorney, Agent, or Firm*—Kenyon & Kenyon

(57) ABSTRACT

A wide angle lens system comprises at least three lens element cemented together as a single lens unit and an object side part of the lens unit has a negative refractive power and a rear part of the lens unit has a positive refractive power.

15 Claims, 18 Drawing Sheets

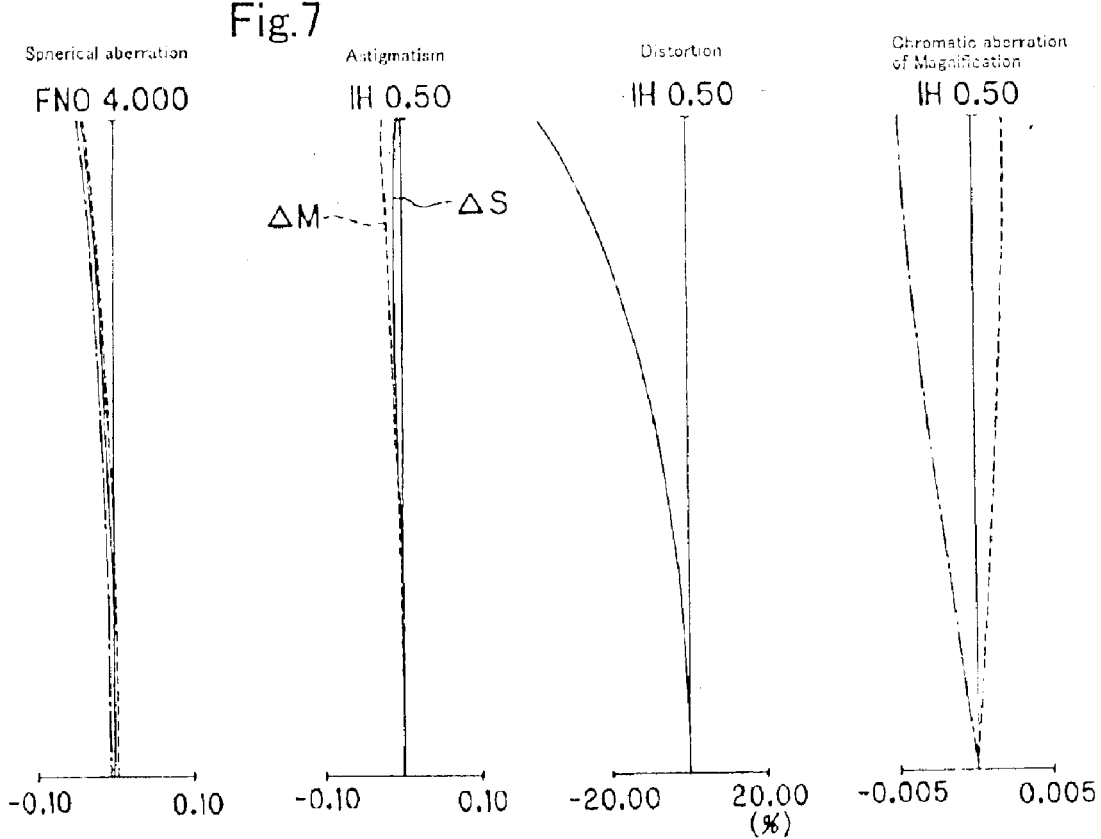

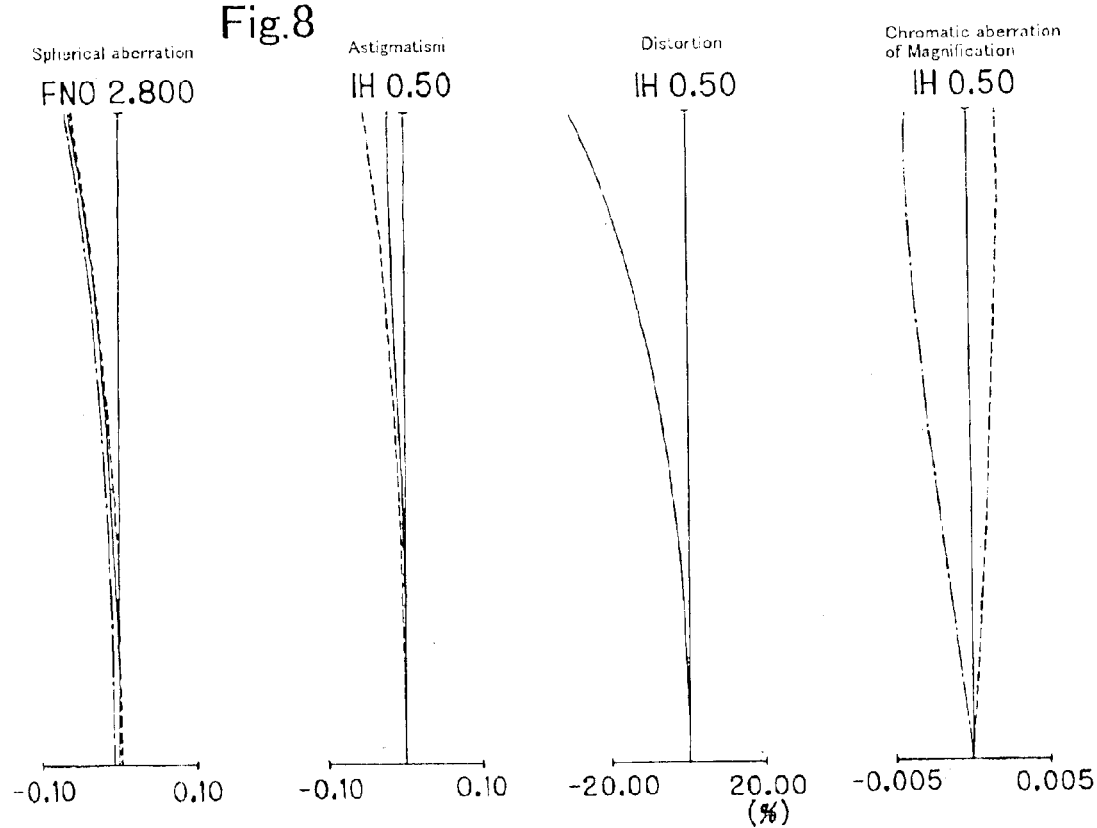

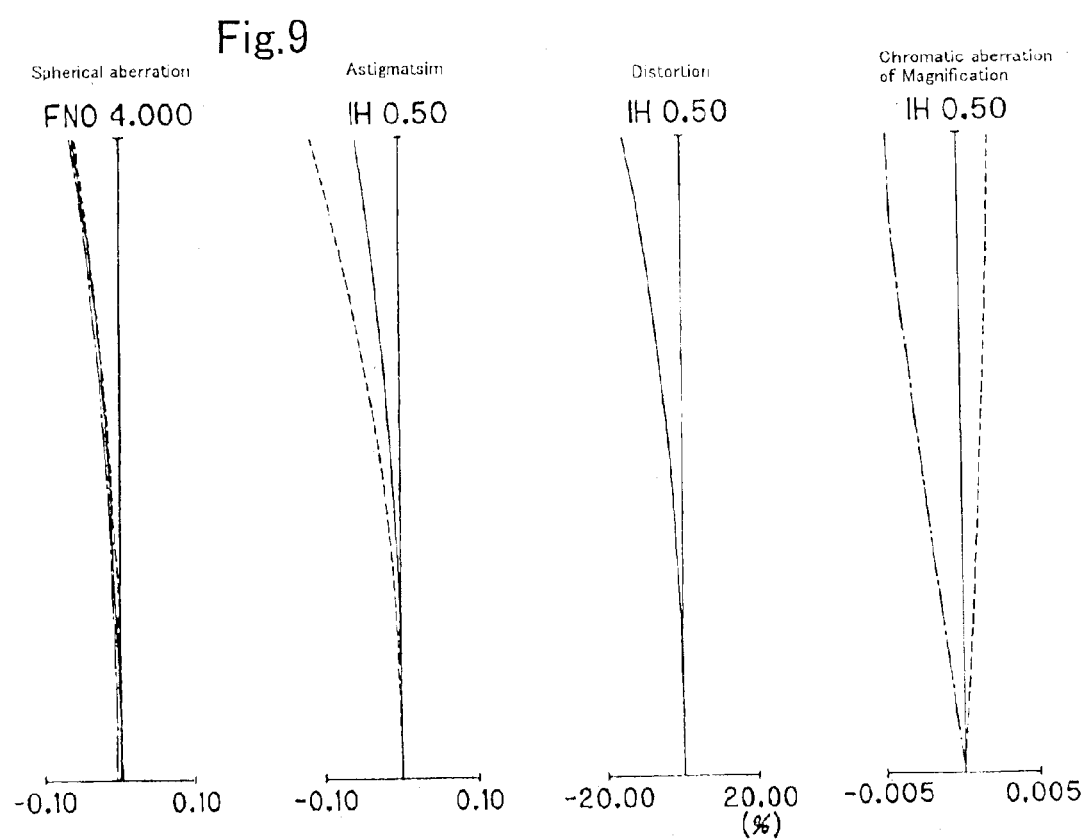

WIDE ANGLE LENS SYSTEM

CROSS-REFERENCE TO RELATED APPLICATION

This application claims benefits of Japanese Patent Application No. 2002-53,440, filed on Feb. 28, 2002, in Japan, the contents of which are hereby incorporated by reference.

BACKGROUND OF THE INVENTION

1. Field of the Invention

This invention relates to a wide angle lens system suitable as a picture taking lens of a picture taking apparatus such as digital cameras.

2. Description of the Related Art

Laid-Open Japanese Patent Application Hei 10-115,776 discloses an image forming lens system that enables simplifying the structure of a lens supporting mechanism such as a lens frame and that has a well corrected aberrations. This lens system is composed of three lens elements cemented together and formed as a single lens unit, and is advantageous to simplify the structure of the lens supporting mechanism because the lens system and an image pickup device can be integrated without using a lens frame. However, this lens system has a field angle of only 50 degrees.

SUMMARY OF THE INVENTION

This invention will provides a lens system having a wide field angle, the size of which is suitable for miniaturizing.

More specifically, the wide angle lens system according to this invention comprises at least three lens elements cemented together as a single lens unit. An object side part of the lens unit has a negative refractive power and a rear part of the lens unit has a positive refractive power. This invention introduces the so-called inverted telephoto type power layout into a cemented single lens unit. This structure is suitable for obtaining a wide field angle by shortening the focal length and for maintaining telecentricity of the lens system at the same time.

FIG. 1 shows a basic power layout of the wide angle lens system according to this invention. The lens system has a single lens unit 10 composed of at least three lens elements cemented. A front part F of the lens unit, which occupies one third (⅓) of the length from the front end of the lens unit, has a negative refractive power and a rear part R of the lens unit, which occupies the remaining two thirds (⅔) of the length from the rear end of the lens unit, has a positive refractive power. This structure enables parallelizing the off-axial chief ray CR having a wide field angle to an optical axis on the image surface thereof. In addition, as the negative power on the object side (front side) and positive power on the image side (rear side) are arranged to have substantial distance therebetween, the refractive power of each of the lens surfaces become relatively weak and this is preferable to reduce aberrations.

Since the lens system according to this invention is formed as a cemented single lens unit, the lens surfaces having refractive powers are all cemented surfaces. Therefore, difference in refractive indices between the optical materials before and after the cemented surface should be large in the case where the cemented-surface is given a strong refractive power. More specifically, the difference in refractive indices will preferably be equal to or larger than 0.15 to give a strong refractive power to the cemented surface.

For the purpose of correcting chromatic aberrations, the positive lenses in the lens unit preferably are made of optical materials having a low dispersion and the negative lenses are made of optical materials having a high dispersion. More specifically, when the Abbe numbers for the Fraunhofer d-line of the higher refractive index material and the lower refractive index material are denoted as $\nu H$ and $\nu L$, respectively, these Abbe numbers preferably satisfy the following condition.

$$\nu H > \nu L - 10 \tag{1}$$

BRIEF DESCRIPTION OF THE DRAWINGS

This invention will become more fully understood from the detailed description given below and the accompanying drawings, which are given by way of illustration only and thus are not limitative of this invention, wherein:

FIG. 7 is a graph of aberrations of the second numerical example.

FIG. 8 is a graph of aberrations of the third numerical example.

FIG. 9 is a graph of aberrations of the fourth numerical example.

DETAILED DESCRIPTION OF THE EXAMPLES OF THE INVENTION

Figure 1:
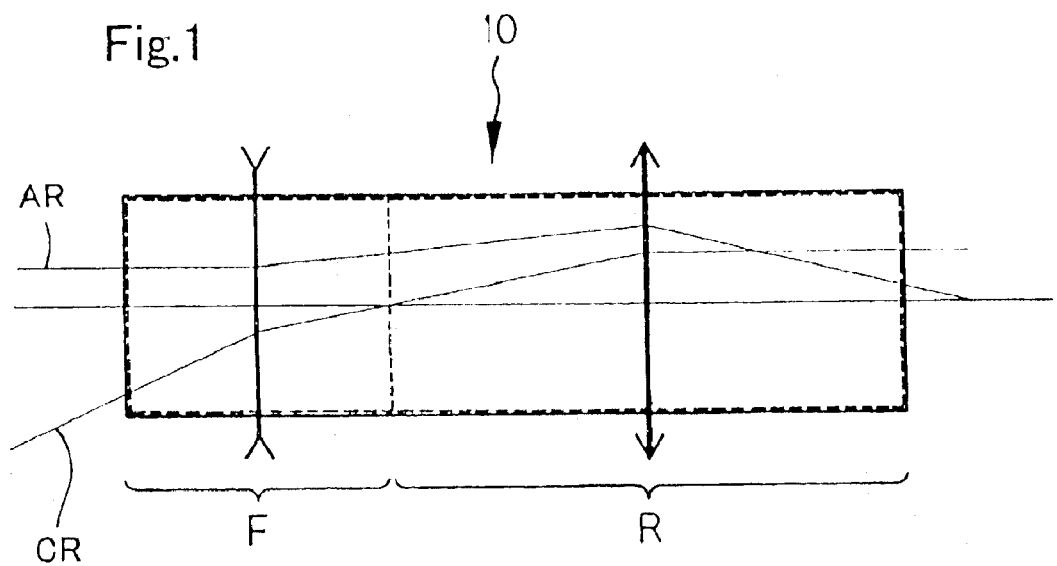
FIG. 1 is a schematic view of the basic power layout of the wide angle lens system according to this invention
Figure 2:
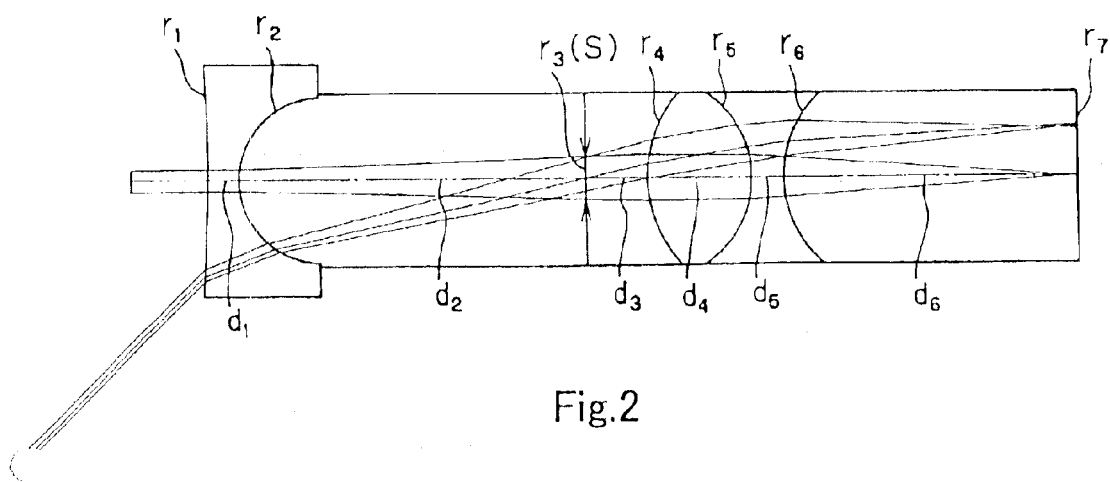
FIG. 2 is a sectional view of a first numerical example of this invention.

FIG. 2 is a sectional view of a first example of this invention. An axial light bundle and an off-axial light bundle for the largest image height, both of which come from an infinite object are shown in the figure.

As shown in FIG. 2, the first example of the wide angle lens system is composed of a negative lens, a positive lens, a positive lens, a negative lens and a positive lens, cemented together in that order from the object side, as a single lens unit. The reference symbol S denotes an aperture stop positioned in the second lens element. The image side surface of the lens unit, that is, the rearmost lens surface r7 is a flat surface and the image position of the infinite object is on the surface r7. By setting the image position on or in the vicinity of the rearmost surface of the lens unit, an image pickup unit, which includes an image pick up device and the lens unit, can be built by cementing the image pickup device directly onto the rearmost surface of the lens unit.

Figure 3:
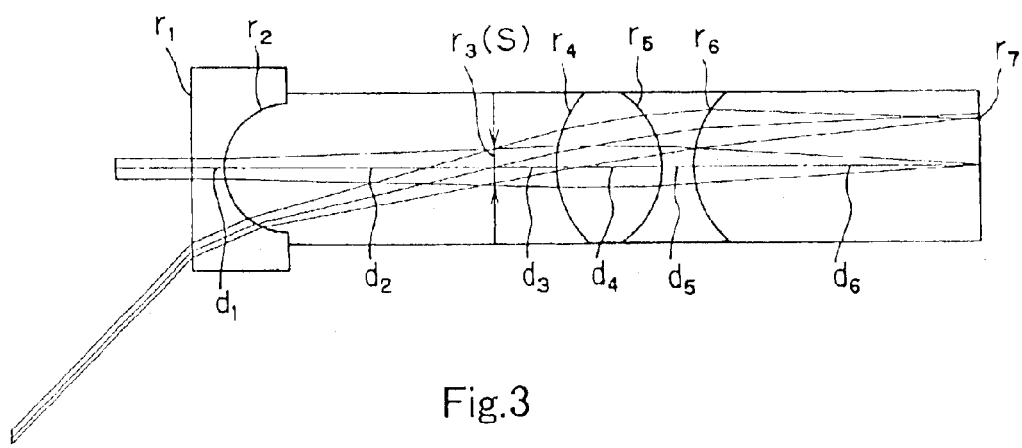
FIG. 3 is a sectional view of a second numerical example of this invention.

FIG. 3 is a sectional view of a second example of this invention. An axial light bundle and an off-axial light bundle for the largest image height, both of which come from an infinite object are shown in the figure.

As shown in FIG. 3, the second example of the wide angle lens system is composed of a negative lens, a positive lens, a positive lens, a negative lens and a positive lens, cemented together in that order from the object side, as a single lens unit. The reference symbol S denotes an aperture stop positioned in the second lens element. The image side surface of the lens unit, that is, the rearmost lens surface r7 is a flat surface and the image position of the infinite object is on the surface r7. By setting the image position on or in the vicinity of the rearmost surface of the lens unit, an image pickup unit, which includes an image pick up device and the lens unit, can be built by cementing the image pickup device directly onto the rearmost surface of the lens unit. The foremost surface, that is, the object side surface of the lens unit, is also a flat surface in this example. It is advantageous for manufacturing the lens unit.

Figure 4:
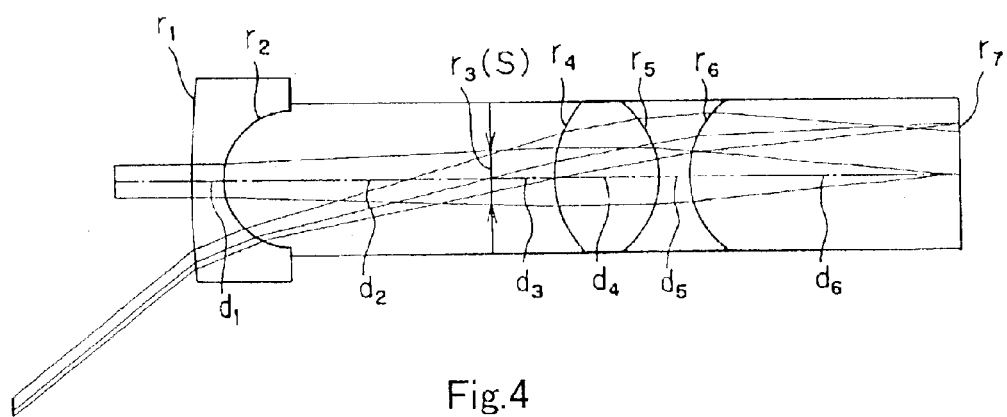
FIG. 4 is a sectional view of a third numerical example of this invention.

FIG. 4 is a sectional view of a third example of this invention. An axial light bundle and an off-axial light bundle for the largest image height, both of which come from an infinite object are shown in the figure.

As shown in FIG. 4, the third example of the wide angle lens system is composed of a negative lens, a positive lens, a positive lens, a negative lens and a positive lens, cemented together in that order from the object side, as a single lens unit. The reference symbol S denotes an aperture stop positioned in the second lens element. The image side surface of the lens unit, that is, the rearmost lens surface r7 is a flat surface and the image position of the infinite object is on the surface r7. By setting the image position on or in the vicinity of the rearmost surface of the lens unit, an image pickup unit, which includes an image pick up device and the lens unit, can be built by cementing an image pickup device directly onto the rearmost surface of the lens unit.

Figure 5:
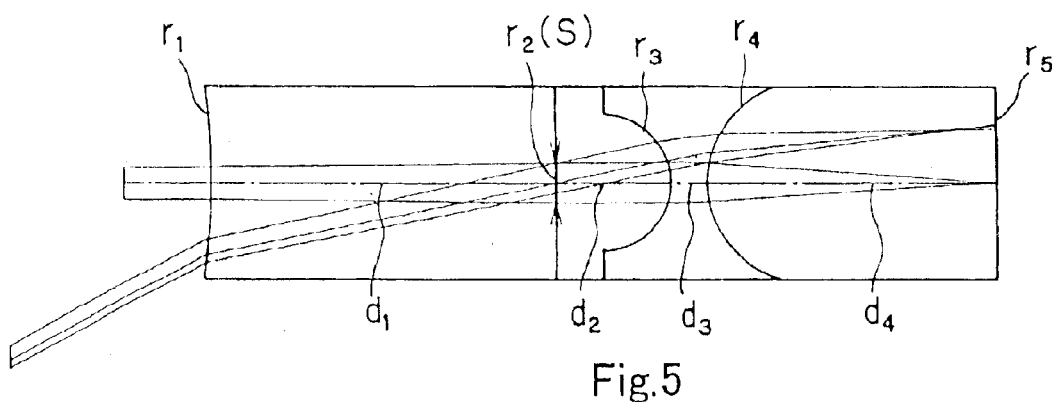
FIG. 5 is a sectional view of a fourth numerical example of this invention.
Figure 6:
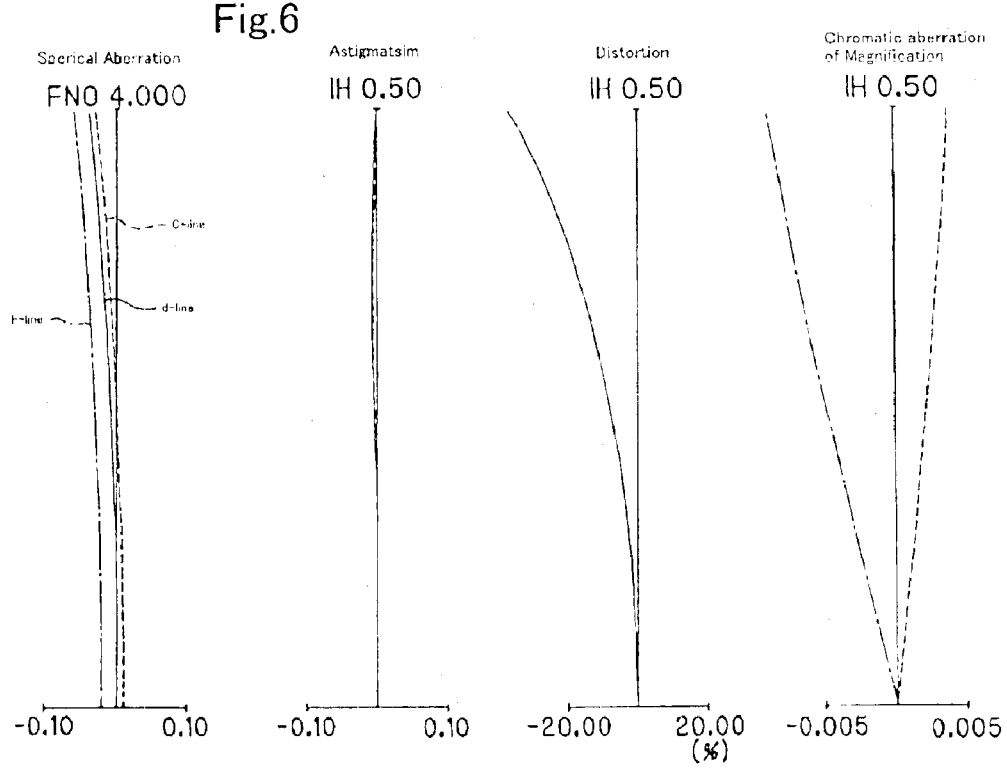
FIG. 6 is a graph of aberrations of the first numerical example.

FIG. 5 is a sectional view of a fourth example of this invention. An axial light bundle and an off-axial light bundle for the largest image height, both of which come from an infinite object are shown in the figure.

As shown in FIG. 5, the fourth example of the wide angle lens system is composed of a positive lens, a negative lens and a positive lens, cemented together in that order from the object side, as a single lens unit. The reference symbol S denotes an aperture stop positioned in the first lens element. The image side surface of the lens unit, that is, the rearmost lens surface r5 is a flat surface and the image position of the infinite object is on the surface r5. By setting the image position on or in the vicinity of the rearmost surface of the lens unit, an image pickup unit, which includes an image pick up device and the lens unit, can be built by cementing an image pickup device directly onto the rearmost surface of the lens unit.

As can be understood from the foregoing description, each of these examples of the wide angle lens systems according to this invention is formed as a single cemented lens unit having a positive refractive power in total and is simple in structure. In addition, each of these lens systems has a negative refractive power in the front part and a positive refractive power in the rear part, that is, has a so-called inverted telephoto type power layout. This enables obtaining a wide field angle by shortening the focal length and maintaining a substantial telecentricity of the lens system at the same time.

These wide angle lens systems are suitable for an objective lens of a digital camera, a surveillance camera, or the like.

Numerical data for the examples are given below. In the data lists, the reference symbol f denotes a focal length of the lens system as a whole, FNO denotes an F-number, IH denotes an image height, 2ω denotes a field angle, r1, r2, . . . denote radii of curvatures of the lens surfaces, d1, d2, . . . denote distances between the lens surfaces, nd1, nd2, . . . denote refractive indices of the optical material of the lenses for the Fraunhofer d-line, and vd1, vd2, . . . denote the Abbe numbers of the optical material of the lenses for the Fraunhofer d-line. The unit of length is the millimeter.

Numerical Data of the First Example

| f = 0.81 | FNO = 4.0 | IH = 0.5 | 2ω = 89.3° |
|---|---|---|---|
| r1 = −20.0000 | d1 = 0.3000 | nd1 = 1.81600 | vd1 = 46.62 |
| r2 = 0.7991 | d2 = 3.4000 | nd2 = 1.51742 | vd2 = 52.43 |
| r3 = ∞ (stop) | d3 = 0.6000 | nd3 = 1.51742 | vd3 = 52.43 |
| r4 = 1.2654 | d4 = 1.0000 | nd4 = 1.81600 | vd4 = 46.62 |
| r5 = −1.0069 | d5 = 0.3000 | nd5 = 1.51742 | vd5 = 52.43 |
| r6 = 1.0583 | d6 = 2.8320 | nd6 = 1.81600 | vd6 = 46.62 |
| r7 = ∞ (image surface) | | | |

Numerical Data of the Second Example

| f = 0.81 | FNO = 4.0 | IH = 0.5 | 2ω = 90.8° |
|---|---|---|---|
| r1 = ∞ | d1 = 0.3000 | nd1 = 1.88300 | vd1 = 40.76 |
| r2 = 0.6210 | d2 = 2.6000 | nd2 = 1.59270 | vd2 = 35.31 |
| r3 = ∞ (stop) | d3 = 0.6000 | nd3 = 1.59270 | vd3 = 35.31 |
| r4 = 1.0536 | d4 = 1.0000 | nd4 = 1.88300 | vd4 = 40.76 |
| r5 = −0.8864 | d5 = 0.3000 | nd5 = 1.59270 | vd5 = 35.31 |
| r6 = 0.9461 | d6 = 2.7055 | nd6 = 1.88300 | vd6 = 40.76 |
| r7 = ∞ (image surface) | | | |

Numerical Data of the Third Example

| f = 0.9 | FNO = 2.8 | IH = 0.5 | 2ω = 77.6° |
|---|---|---|---|
| r1 = 10.0350 | d1 = 0.3000 | nd1 = 1.88300 | vd1 = 40.76 |
| r2 = 0.6553 | d2 = 2.6000 | nd2 = 1.59270 | vd2 = 35.31 |
| r3 = ∞ (stop) | d3 = 0.6000 | nd3 = 1.59270 | vd3 = 35.31 |
| r4 = 1.0761 | d4 = 1.0000 | nd4 = 1.88300 | vd4 = 40.76 |
| r5 = −0.9100 | d5 = 0.3000 | nd5 = 1.59270 | vd5 = 35.31 |
| r6 = 0.9036 | d6 = 2.5617 | nd6 = 1.88300 | vd6 = 40.76 |
| r7 = ∞ (image surface) | | | |

Numerical Data of the Fourth Example

| f = 1.11 | FNO = 4.0 | IH = 0.5 | 2ω = 55.8° |
|---|---|---|---|
| r1 = −6.8862 | d1 = 3.0000 | nd1 = 1.88300 | vd1 = 40.76 |
| r2 = ∞ (stop) | d2 = 1.0000 | nd2 = 1.88300 | vd2 = 40.76 |
| r3 = −0.5816 | d3 = 0.3000 | nd3 = 1.59270 | vd3 = 35.31 |
| r4 = 0.8672 | d4 = 2.4605 | nd4 = 1.88300 | vd4 = 40.76 |
| r5 = ∞ (image surface) | | | |

FIGS. 6 through 9 are graphs of aberrations of the first through fourth examples, respectively for an infinite object.

Each of the wide angle lens systems of above examples is formed as a single lens unit in which all lens elements are cemented with each other. Therefore, the positional relationship of the constituent lens elements is fixed without using lens frames. This enables simplifying the structure of the lens system (including lens frames) as a whole. The circumferential surface of the lens unit, that is, the surface of the lens unit except the entrance surface and the exit surface, is covered by a coating having a light shielding property, such as a black paint, to prevent an undesired flare from occurring from an internal reflection and undesired light from entering the lens unit.

In this invention, the image pickup unit can be formed by cementing the image pickup device directly onto the rearmost lens surface of the wide angle lens unit as described above.

In this structure, the image pickup unit is built with only two parts, the wide angle lens unit and the image pickup device (bare chip), and is extremely simplified.

Figure 10A:
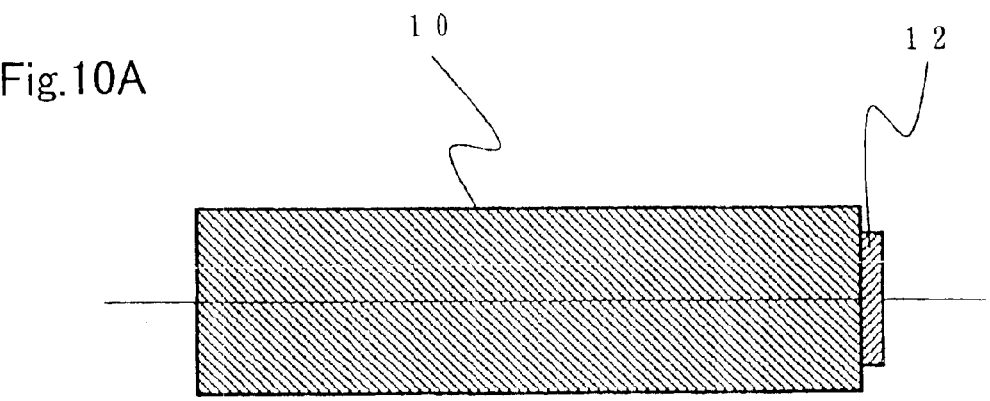
FIG. 10 is a schematic view to explain the relationship between the wide angle lens system and an image pickup device.
Figure 10B:
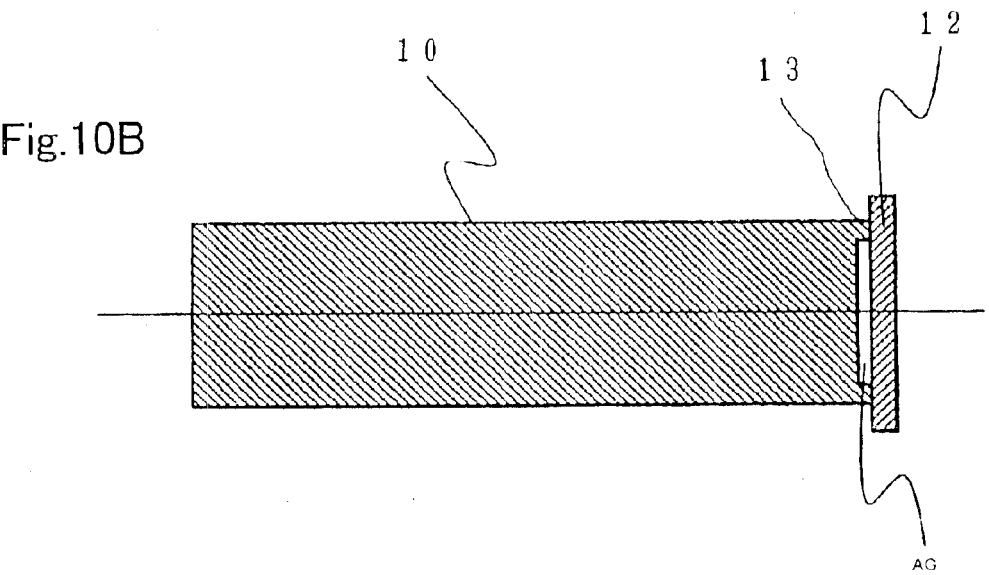

FIG. 10 shows manners of cementing the image pickup device onto the end surface of the wide angle lens unit. In FIG. 10A, the image side surface of the wide angle lens unit 10 is formed as a flat surface and the image receiving surface of the image pickup device chip 12 such as a CCD image sensor is directly cemented onto the flat surface. In FIG. 10B, a protrusion 13 is formed on the periphery of the image side surface of the wide angle lens unit 10 and the image receiving surface of the image pickup device chip 12 is cemented to the protrusion 13. A small air gap AG is formed between the image side surface of the lens unit 12 and the image receiving surface of the image pickup device 12. The air gap AG is preferably more than a few microns (μms) in thickness. This structure enables using an image pickup device having a micro lens array composed of a multiplicity of juxtaposed small positive lenses on the image receiving surface thereof, without impairment of the light converging capability of the micro lens array.

Figure 11:
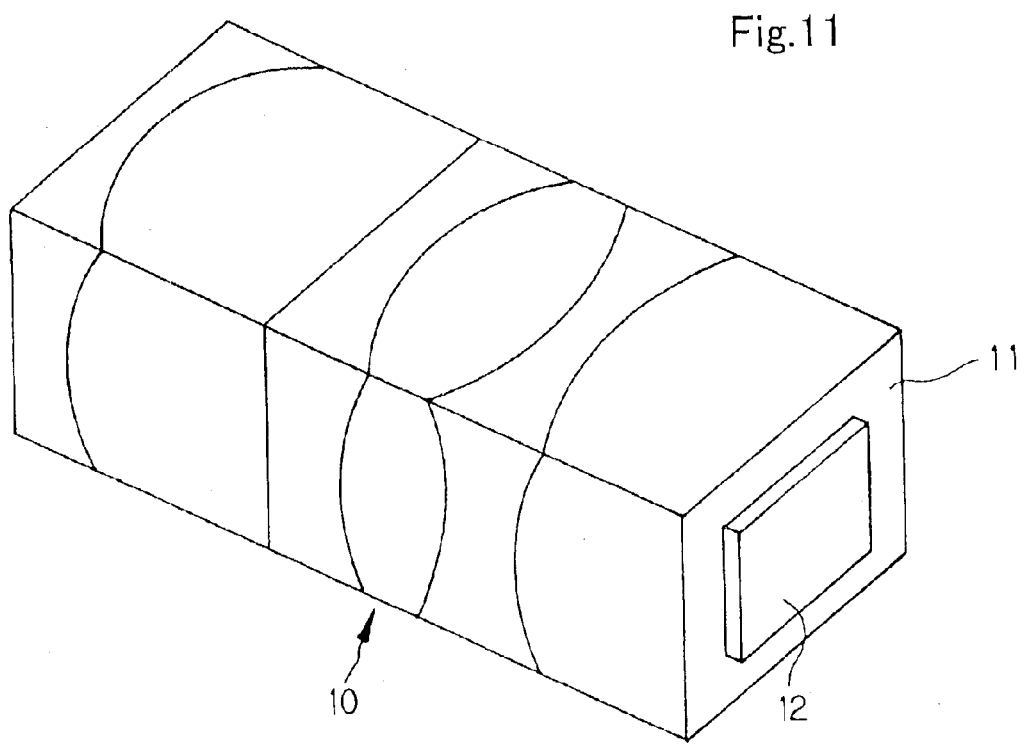
FIG. 11 is a back oblique view of a rectangular-shaped wide angle lens system and an image pickup device.

The circumferential shape, that is, the cross sectional shape perpendicular to the optical axis, of the wide angle lens system 10 can be formed not only in a circular shape but also as an elliptical or elongated circular shape, which is formed by cutting off the opposite sides of a circular lens, or as a rectangular shape. FIG. 11 shows an example of the wide angle lens system having a rectangularly shaped circumferential surface.

In the wide angle lens system of this invention, the lens surfaces having optical powers are all cemented surfaces. Therefore, light rays entering these lens surfaces are gently refracted by the lens surfaces. This contributes to a reduction of the deterioration of aberrations caused by de-centering of the lenses constituting the lens system and is advantageous particularly when manufacturing a small lens system.

The wide angle lens system described above may be applied to a picture taking apparatus such as a digital camera, a camcorder, or a information processing apparatus such as a personal computer, a telephone (particularly a cellular phone that is easy to carry), or the like, which has an image pickup device such as CCD image sensor or a silver-salt film as an image receiving means. Some examples of these apparatuses are explained below.

Figure 12:
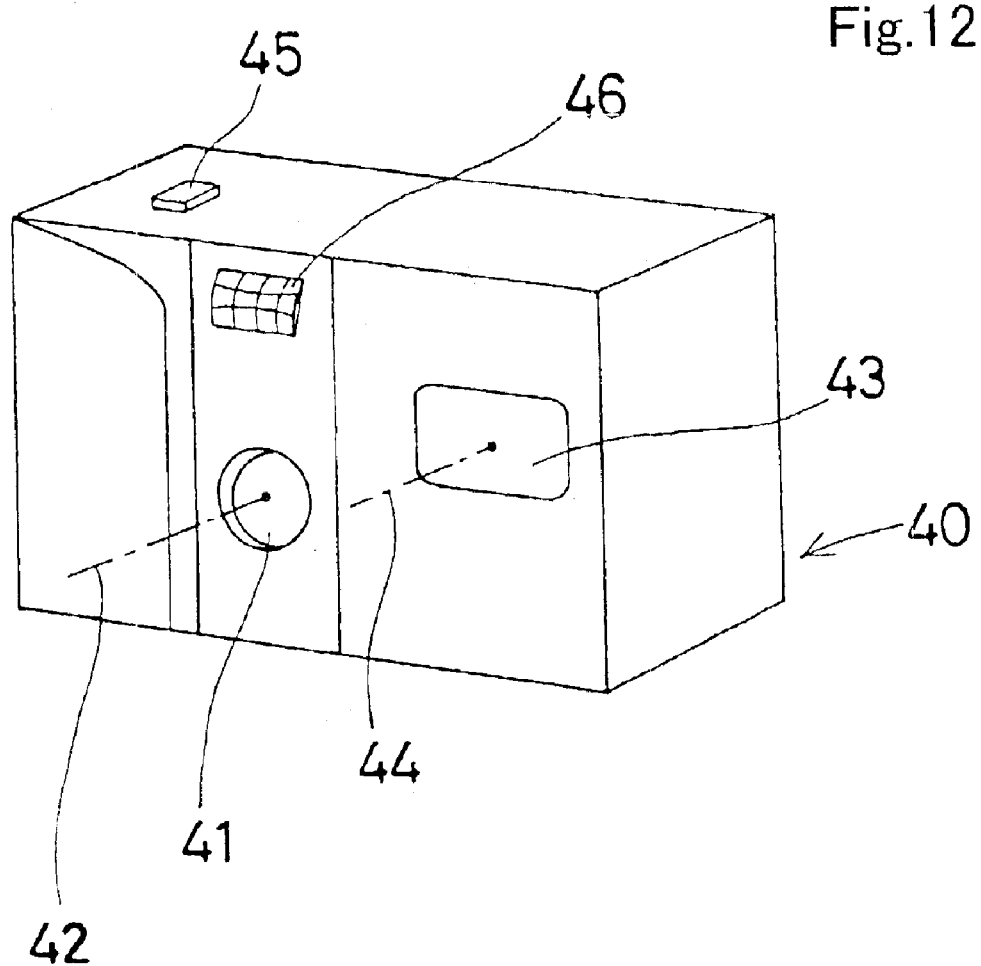
FIG. 12 is a front oblique view of a digital camera having a lens system according to this invention as an objective lens.
Figure 13:
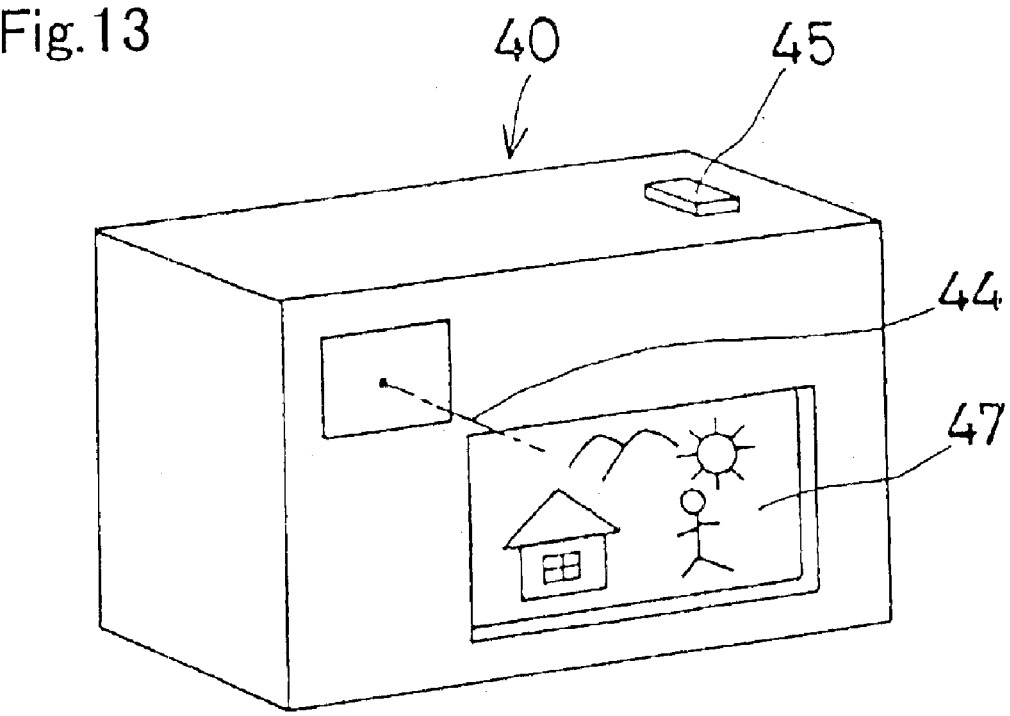
FIG. 13 is a back oblique view of the digital camera shown in FIG. 12.
Figure 14:
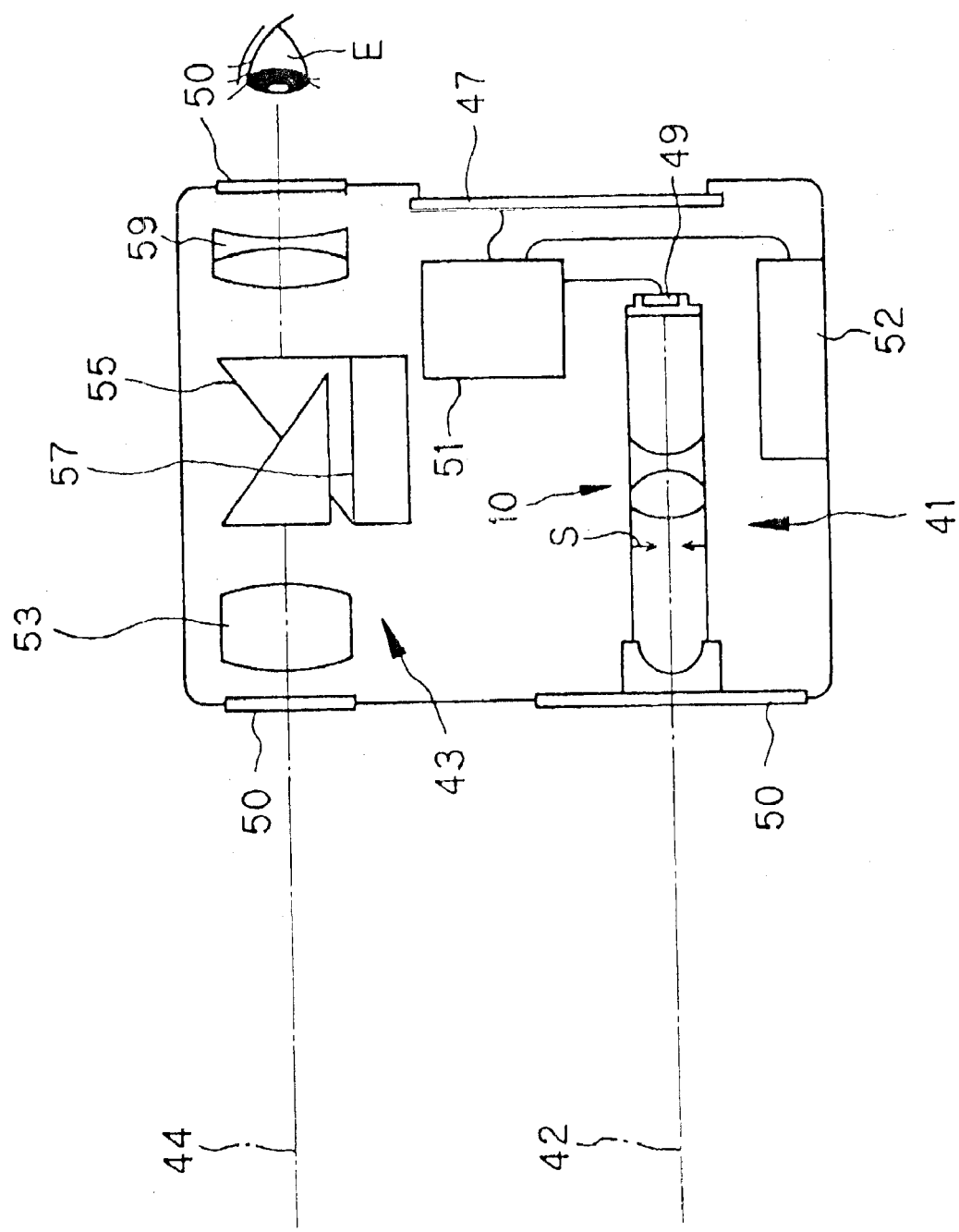
FIG. 14 is a cross sectional view of the digital camera shown in FIG. 12.

FIGS. 12 through 14 are schematic views of a digital camera. FIG. 12 is a front oblique view, FIG. 13 is a back oblique view, and FIG. 14 is a sectional view of the digital camera 40, respectively.

The digital camera 40 comprises a picture taking optical system 41 having a picture taking optical path 42, a finder optical system 43 having a finder optical path 44, a shutter button 45, an electronic flash 46, and a liquid crystal display 47. By depressing the shutter button 45 arranged on the top of the camera 40, a picture of an object is taken through the picture taking optical system 41 such as the wide angle lens system of the second example described above. The image is formed on the image receiving surface of the CCD image sensor 49, which is cemented on the exit end surface of the picture taking optical system 41. The image received by the CCD image sensor 49 is displayed on the liquid crystal display 47 mounted on the backside of the camera 40 through the signal processing means 51. The image can be recorded in the recording means 52 connected to the signal processing means 51. The recording means 52 may be detachable from the processing means 51, and the image may be magnetically, electrically or optically recorded on media such as a floppy disc, a memory card, a magneto-optical disc, or the like. A silver-salt film can be used as an image receiving means and in that case, the camera is formed as a photographic film camera.

Further, an objective lens 53 of the finder optical system is located on the finder optical path 44. An image of the object is formed on the plane of the field mask 57 that is disposed on a Porro-prism system 55 arranged as an image erecting member. An eyepiece optical system 59 is located on the rear side of the Porro-prism system 55 to lead the erected image to the observer's eye E. Cover members 50 are provided on the entrance sides of the picture taking optical system 41 and the objective lens system 53 of the finder optical system, and on the exit side of the eyepiece optical system 59. The cover member 50 arranged in front of the picture taking optical system 41 can be omitted and the front surface of the image taking optical system can be exposed to the air.

Figure 15:
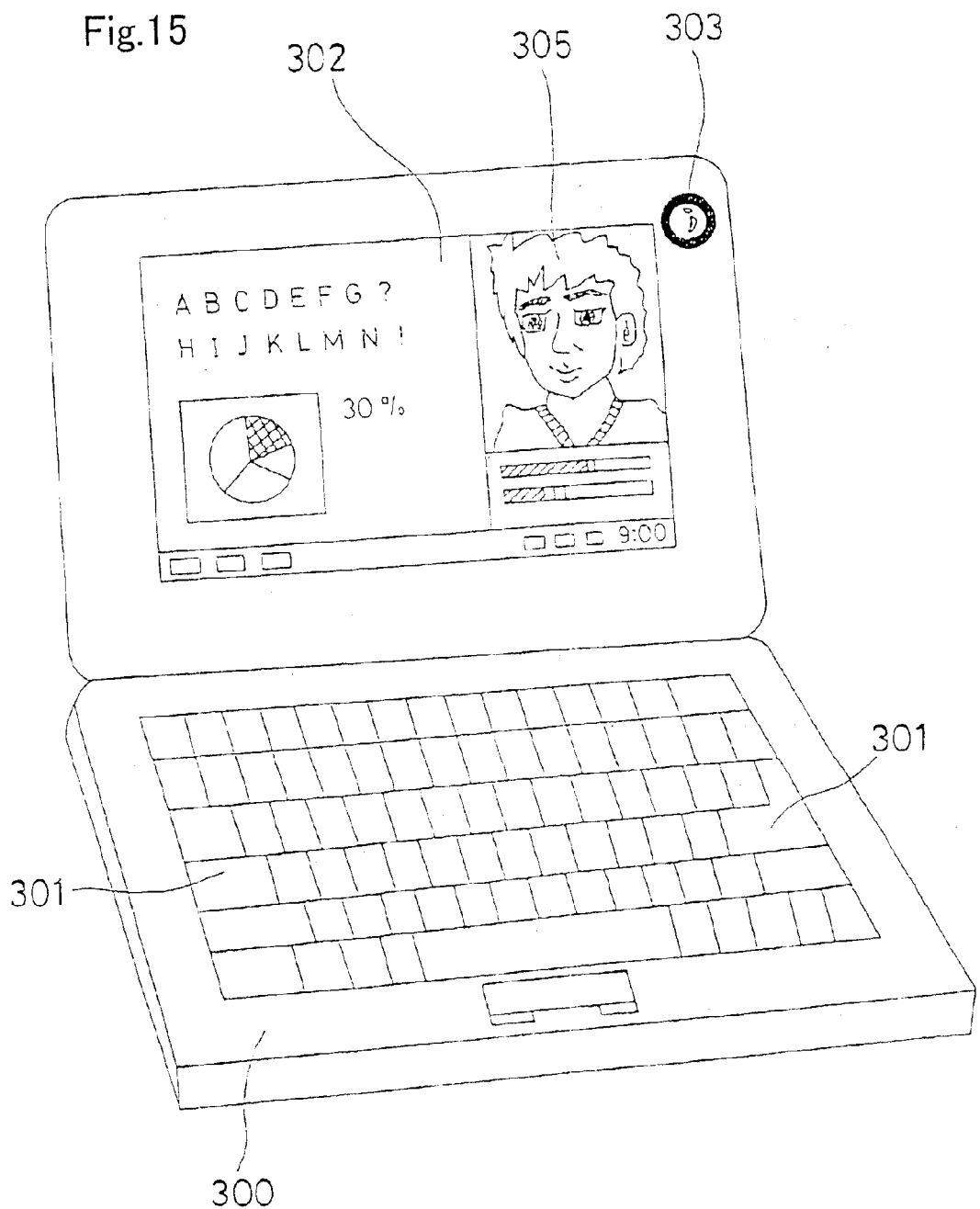
FIG. 15 is a front oblique view of a personal computer having a wide angle lens system according to this invention as an objective lens.
Figure 16:
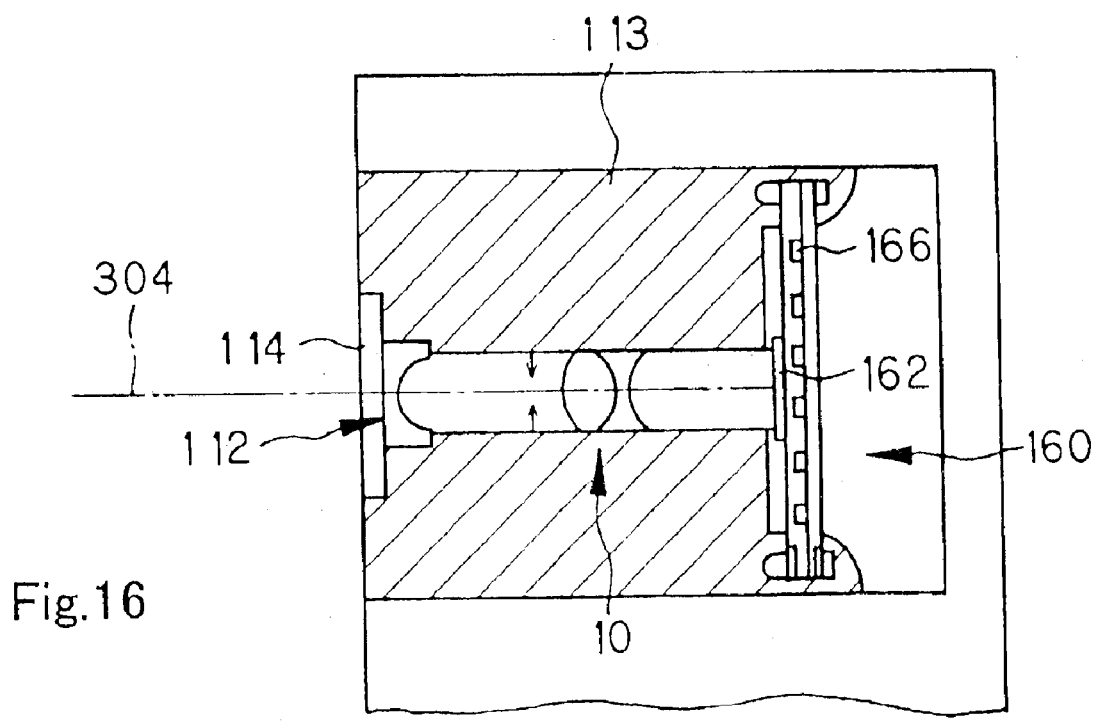
FIG. 16 is a sectional view of a picture taking optical system of the personal computer shown in FIG. 15.
Figure 17:
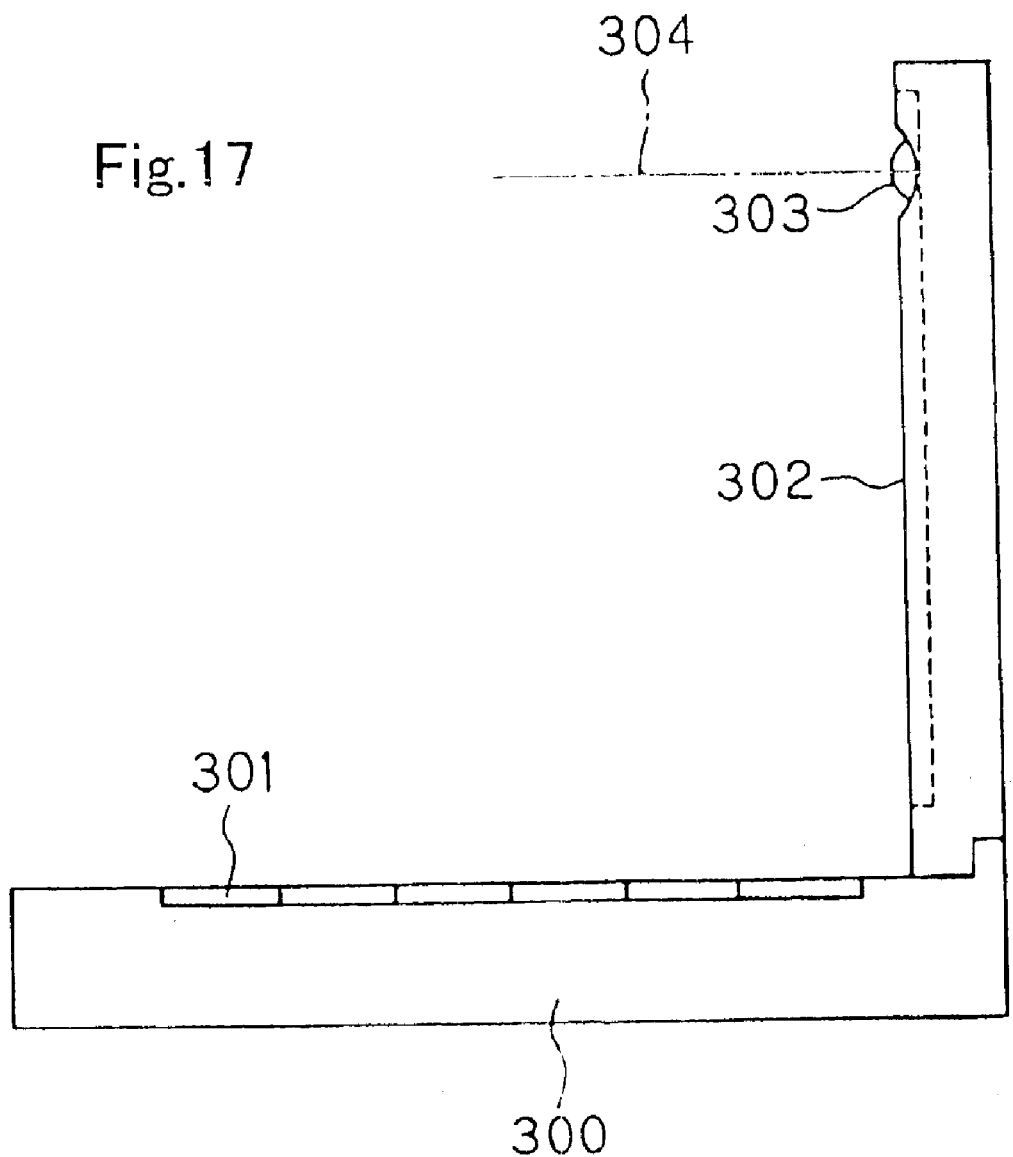
FIG. 17 is a side view of the personal computer shown in FIG. 15.

Next, a personal computer, as an example of the information processing apparatus, including the wide angle lens system as a picture taking optical system is shown in FIGS. 15 through 17. FIG. 15 is a front oblique view of the personal computer 300 when the cover is opened. FIG. 16 is a sectional view of the picture taking optical system 303 of the personal computer 300. FIG. 17 is a side view of the personal computer shown in FIG. 15.

As shown in FIGS. 15 through 17, the personal computer 300 has a keyboard for enabling the user to input information, an information processing means and a recording means (not shown), a monitor 302 for displaying information to the user, and a picture taking optical system 303 for taking a picture of the user itself or the neighborhood thereof. The monitor 302 may be composed of a transmission type liquid crystal display device illuminated from the back side by an illumination light emanated from a back light source (not shown), a reflection type liquid crystal display device reflecting the light entering from the front side, a cathode ray tube, or the like. The position of the picture taking optical system 303 is not limited at the top right-hand side of the monitor, but may be placed anywhere around the monitor 302 and keyboard 301.

The picture taking optical system 303 has a n objective lens 112 that is a wide angle lens system such as the second example of this invention and an image pickup device chip 162 on the picture taking optical path. These constituent elements are contained in the body of the personal computer 300. The image pickup device chip 162 can be attached to the end surface of the objective lens 112 by snapping the package enclosing the chip 162 onto the rear end of the lens frame 113 in a one-touch operation to form an imaging unit. Therefore, an alignment of the objective lens 112 and the image pickup device chip 162 or an adjustment of the distance between these two parts is unnecessary and an assembling process for the electronic picture taking apparatus is simplified. At the front end of the lens barrel 113, a cover glass 114 is attached to protect the objective lens 112. The cover glass 114 can be omitted and the front surface of the objective lens system 112 can be exposed to the air.

The object image focused on the image pickup device chip 162 is converted into an electronic signal by the device 162, supplied to the processing means of the computer 300 through the terminal 166, and displayed on the monitor 302 as an electronic image. In FIG. 15, an image of the user himself 305 appears on the monitor screen as an example. The image 305 can be transmitted to and displayed on the other computers at remote sites via the Internet or a telephone communication.

Next, a telephone including a wide angle lens system 10 according to this invention as an picture taking optical system, particularly a cellular phone that is easy to carry, is described as an example of the information processing apparatus.

Figure 18:
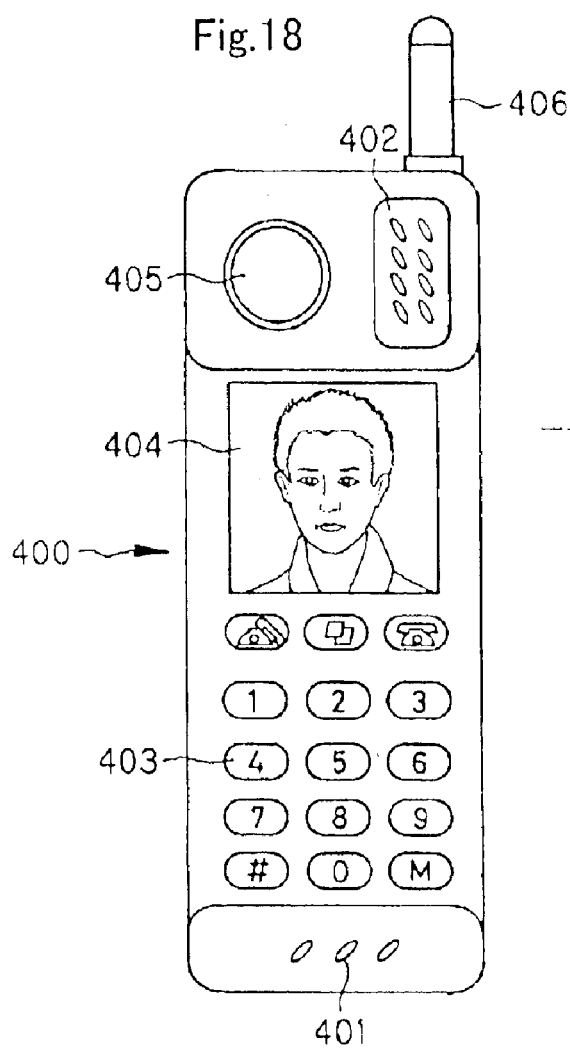
FIG. 18 is a front view of a cellular phone having a wide angle lens system according to this invention as an objective lens.
Figure 19:
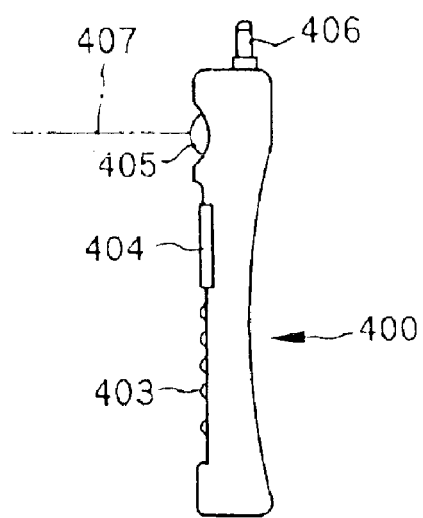
FIG. 19 is a side view of the cellular phone shown in FIG. 18.
Figure 20:
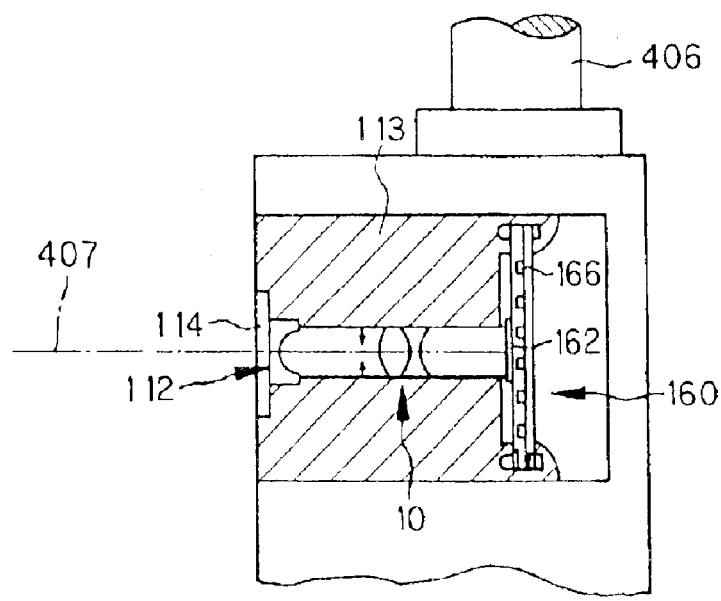
FIG. 20 is a sectional view of the picture taking optical system of the cellular phone shown in FIG. 18.

FIG. 18 is a front view of the cellular phone, FIG. 19 is a side view of the cellular phone, and FIG. 20 is a sectional view of the picture taking optical system 405. As shown in these figures, the cellular phone 400 has a microphone 401 for inputting the voice of the user as information to the cellular phone, a speaker 402 for outputting the voice of the party on the other end, push buttons 403 for inputting information, a monitor 404 for displaying an image of the user or the party on the other end and information such as a telephone number, a picture taking optical system 405, an antenna 406 for transmitting and receiving a radio waves, and a processing means (not shown) for processing images, communication data, input signals, and so forth. The monitor 404 is a liquid crystal display device. The layout of these parts is not limited to the specific arrangement indicated in the se figures. The picture taking optical system 405 has an objective lens 112 that is a wide angle lens system such as the second example of this invention and an image pickup device chip 162 on the picture taking optical path 407. These constituent elements are contained in the body of the cellular phone 400.

The image pickup device chip 162 can be attached to the end surface of the objective lens 112 by snapping the package enclosing the chip 162 onto the rear end of the lens frame 113 in a one-touch operation to form an imaging unit. Therefore, an alignment of the objective lens 112 and the image pickup device chip 162 or an adjustment of the distance between these two parts is unnecessary and an assembling process of the electronic picture taking apparatus is simplified. At the front end of the lens barrel 113, a cover glass 114 is attached to protect the objective lens 112. The cover glass 114 can be omitted and the front surface of the objective lens system 112 can be exposed to the air.

The object image focused on the image pickup device chip 162 is converted into an electronic signal by the device 162, supplied to the processing means through the terminal 166, and displayed on the monitor 404 and/or on the monitor of the equipment of the party on the other end as an electronic image. The processing means also functions to convert the image information obtained by the image pickup device 162 into a signal for transmitting the image to the other party.

Although this invention has been described with respect to the examples shown in the drawings, this invention is not to be limited the above examples but, on the contrary, various modifications are possible to without departing from the spirit of this invention. All such modifications as would be obvious to one of ordinary skill in the art are intended to be included within the scope of the following claims.

What is claimed is:

1. A wide angle lens system comprising at least three lens elements cemented together as a single lens unit, wherein the single lens unit has an object side part having a negative refractive power and occupying one third ($\frac{1}{3}$) of the single lens unit in length from the front end thereof, and an image side part having a positive refractive power and occupying the remaining two thirds ($\frac{2}{3}$) of the single lens unit in length from the rear end thereof.

2. The wide angle lens system recited in claim 1, wherein an image side surface of the single lens unit is formed as a fat surface.

3. The wide angle lens system recited in claim 2, further comprising an image surface disposed on or in the vicinity of the image side surface of the wide angle lens system.

4. A picture taking apparatus comprising:

the wide angle lens system recited claim 1; and an image pickup device cemented directly onto an image side surface of the wide angle lens system.

5. A digital camera comprising:

a picture taking optical system having a picture taking optical path;

a shutter button, an electronic flash, and a display unit, wherein the picture taking optical system is the wide angle lens system recited in claim 1.

6. A personal computer comprising:

a picture taking optical system;

a keyboard;

a display unit; and an information processing means, wherein the picture taking optical system is the wide angle lens system recited in claim 1.

7. A cellular phone comprising:

a picture taking optical system;

a microphone, a speaker, push buttons, a display unit; and an antenna, wherein the picture taking optical system is the wide angle lens system recited in claim 1.

8. A wide angle lens system comprising at least three lens elements cemented together as a single lens unit, wherein the lens unit has an object side part occupying one third ($\frac{1}{3}$) of the lens unit in length from the front end thereof having a negative refractive power, and an image side part occupying the remaining two thirds ($\frac{2}{3}$) of the lens unit in length from the rear end thereof, and wherein the object side part includes a refracting surface having a negative refractive power and a difference between refractive indices of optical materials before and after the refracting surface is equal to or larger than 0.15.

9. The wide angle lens system recited in claim 8, wherein the lens system has a cemented surface and satisfies the following condition:

$$vH > vL - 10 \tag{1}$$

wherein vH is an Abbe number, for the Fraunhofer d-line, of an optical material disposed before or after the cemented surface which has a higher refractive index, and vL is an Abbe number, for the Fraunhofer d-line, of an optical material disposed before or after the cemented surface which has a lower refractive index.

10. A wide angle lens system comprising at least three lens elements cemented together as a single lens unit, wherein the lens unit has an object side part occupying one third (⅓) of the lens unit in length from the front end thereof having a negative refractive power, and an image side part occupying the remaining two thirds (⅔) of the lens unit in length from the rear end thereof, and wherein the image side part includes a refracting surface having a positive refractive power and a difference between refractive indices of optical materials before and after the refracting surface is equal to or larger than 0.15.

11. The wide angle lens system recited in claim 10, wherein the lens system has a cemented surface and satisfies the following condition:

$$vH > vL - 10 \tag{1}$$

wherein vH is an Abbe number, for the Fraunhofer d-line, of an optical material disposed before or after the cemented surface which has a higher refractive index, and vL is an Abbe number, for the Fraunhofer d-line, of an optical material disposed before or after the cemented surface which has a lower refractive index.

12. A wide angle lens system comprising at least three lens elements cemented together as a single lens unit;

wherein the single lens unit has an object side part having a negative refractive power and an image side part having a positive refractive power, and the image point of the infinite object is located substantially on or adjacent to the rear most surface of the single lens unit.

13. A wide angle lens system comprising:

a single lens unit made of at least three lens elements cemented together;

an image pickup chip placed adjacent to the rearmost surface of the single lens unit, wherein the single lens unit has an object side part having a negative refractive power and an image side part having a positive refractive power.

14. A wide angle optical system comprising:

an optical unit made of at least three optical elements cemented together;

an image pickup chip placed adjacent to the rearmost surface of the optical unit, wherein the optical unit has an object side part having a negative refractive power and an image side part having a positive refractive power.

15. A wide angle lens system solely consisting of a single lens unit, wherein the single lens unit is consisting of three or more lenses cemented together, and wherein the single lens unit has an object side part having a negative refractive power and occupying one third (⅓) of the single lens unit in length from the front end thereof, and an image side part having a positive refractive power and occupying the remaining two thirds (⅔) of the single lens unit in length from the rear end thereof.

* * * * *

UNITED STATES PATENT AND TRADEMARK OFFICE
CERTIFICATE OF CORRECTION

PATENT NO. : 6,870,692 B2
DATED : March 22, 2005
INVENTOR(S) : Hirofumi Tsuchida It is certified that error appears in the above-identified patent and that said Letters Patent is hereby corrected as shown below:

<u>Column 8,</u>
Line 25, change "fat" to -- flat --.

Signed and Sealed this

Seventeenth Day of January, 2006

JON W. DUDAS
*Director of the United States Patent and Trademark Office*